(12) United States Patent
Hakuta et al.

(10) Patent No.: US 6,437,516 B2
(45) Date of Patent: Aug. 20, 2002

(54) UNSATURATING TRANSFORMER, AN ELECTRONIC BALLAST USING THE TRANSFORMER, AND A SELF-BALLASTED

(75) Inventors: Shinya Hakuta; Hajime Osaki, both of Kanagawa-ken (JP)

(73) Assignee: Toshiba Lighting and Technology Corporation, Tokyo (JP)

( * ) Notice: Subject to any disclaimer, the term of this patent is extended or adjusted under 35 U.S.C. 154(b) by 0 days.

(21) Appl. No.: 09/770,651

(22) Filed: Jan. 29, 2001

(30) Foreign Application Priority Data

Jan. 27, 2000 (JP) .......................... 2000-019384

(51) Int. Cl.⁷ .............................................. H05B 37/00
(52) U.S. Cl. ...................... 315/244; 315/225; 315/291
(58) Field of Search .............................. 315/244, 200 R, 315/209 R, 224, 225, 226, 209 T, 276, 282, 283, 291, 307, DIG. 2, DIG. 5, DIG. 7

(56) References Cited

U.S. PATENT DOCUMENTS 5,864,212 A  *  1/1999  Sullivan ...................... 315/219
6,054,815 A  *  4/2000  Sugita et al. ................ 315/244
6,140,779 A  * 10/2000  Kanazawa et al. .......... 315/291

FOREIGN PATENT DOCUMENTS

JP          9-190891         7/1997
JP         10-162983         6/1998

* cited by examiner

*Primary Examiner*—Don Wong
*Assistant Examiner*—Thuy Vinh Tran
(74) *Attorney, Agent, or Firm*—Pillsbury Winthrop LLP

(57) ABSTRACT

A power supply apparatus includes a direct current power source having a pair of terminals. First and second switching elements are connected in series between the pair of terminals of the direct current power. A load circuit, which includes a resonance inductance and a resonance capacitance, receives a high-frequency alternating current generated by a switching of the first and second switching elements. An unsaturated transformer has a first winding connected to the load circuit, and a second winding generating an induced voltage in proportion to a current flowing in the load circuit. A drive resonance circuit includes a capacitance, and an inductance of the second winding. The drive resonance circuit produces a resonance output to cause the first and second switching elements to alternately conduct. The power supply may be used in a ballast for a discharge lamp.

8 Claims, 11 Drawing Sheets

UNSATURATING TRANSFORMER, AN ELECTRONIC BALLAST USING THE TRANSFORMER, AND A SELF-BALLASTED

BACKGROUND OF THE INVENTION

1. Field of the Invention

The present invention relates to a power supply apparatus which is suitable for use as a half-bridge inverter, an electronic ballast using the power supply, and a self-ballasted fluorescent lamp including the power supply.

2. Description of the Related Art

An electronic ballast for a discharge lamp, including a half-bridge inverter, is known in Japanese Laid Open Patent Application HEI 9-190891 (the '891 application). According to FIG. 1 of the '891 application, the ballast comprises a load circuit having an inductance (L2) and at least one of capacitors (C7, C8, C9), a half-bridge inverter including a pair of switching elements (T1, T2), and a drive circuit (AS) generating a drive signal. The drive circuit further comprises a first drive circuit (AS1) and a second drive circuit (AS2) connected to the switching elements respectively. The first drive circuit (AS1) is provided with an additional winding (HW1) and an LC parallel resonance circuit (L3, C3). The second drive circuit (AS2) includes an additional winding (HW2) and a LC parallel resonance circuit (L4, C4). Each additional winding (HW1, HW2) is magnetically to the current-limiting inductance (L2) of the load circuit.

Furthermore, another electronic ballast is disclosed in Japanese Laid Open Patent Application HEI 10-162983 (the '983 application). According to FIG. 1 of the '983 application, A half-bridge inverter comprises a resonance load circuit (16) including a resonance inductor (LR), a resonance capacitance (CR), and a pair of complementary switching elements (Q1, Q2). A gate drive circuit (30) of the half-bridge inverter employs a drive inductor (LD) electrically and magnetically coupled to resonance inductor (LR), a secondary inductor (32) connected directly to the drive inductor (LD), and a bi-directional voltage clamp (36) in order to clamp the gate voltage of the pair of switching elements (Q1, Q2). Accordingly, only one gate drive circuit (30) can control a pair of switching elements (Q1, Q2). According to the above prior art ballasts, the additional windings (WH1, WH2) or the drive inductor (LD) are respectively coupled magnetically to the current-limiting inductor (L2) or the resonance inductor (LR).

In these examples, since the current-limiting inductor (L2) or the resonance inductor (LR) has a high resonance voltage during the lamp operation, the additional windings (WH1, WH2) or the drive inductor (LD) should be highly electrically insulated. Otherwise, the additional windings or the drive inductor occasionally operates in error. However, when the additional windings or the drive inductor is highly insulated, the volume of the windings or the drive inductor tends to become larger.

Furthermore, since the current-limiting inductor (L2) or the resonance inductor (LR) has a high resonance voltage during the lamp operation, the temperature rises. As the heat of the inductor (L2, LR) is conducted to the additional windings (WH1, WH2) or the drive inductor (LD), the characteristics of these components tend to change. Therefore, it is difficult to design the additional windings or the drive inductor.

Moreover, the additional windings (WH1, WH2) or the drive inductor (LD) must be exactly located adjacent to the current-limiting inductor (L2) or the resonance inductor (LR). If these components are not accurately arranged relative to the current-limiting inductor (L2) or the resonance inductor (LR), the magnetic characteristics occasionally change. It is difficult to accurately position the current-limiting inductor (L2) and the resonance inductor (LR).

SUMMARY OF THE INVENTION

According to one aspect of the invention, a power supply apparatus comprises a direct current power source having a pair of terminals. First and second switching elements are connected in series between the pair of terminals of the direct current power. A load circuit, which includes a resonance inductance and a resonance capacitance, receives a high-frequency alternating current generated by the switching of the first and second switching elements. An unsaturated transformer, has a first winding connected to the load circuit, and a second winding which generates an induced voltage in proportion to the current flowing in the load circuit. A drive resonance circuit includes a capacitance, and the inductance of the second winding. The drive resonance circuit generates a resonance output to cause the first and second switching elements to alternately conduct.

According to another aspect of the invention, an electronic ballast using the power supply comprises the power supply apparatus, and a discharge lamp connected as the load circuit.

According to still another aspect of the invention, a self-ballasted fluorescent lamp comprises the electronic ballast using the power supply, and an enclosure accommodating the discharge lamp.

These and other aspects of the invention will be further described in the following drawings and detailed description of the invention.

BRIEF DESCRIPTION OF THE DRAWINGS

The invention will be described in more detail below by way of examples illustrated by drawings in which.

DETAILED DESCRIPTION OF SEVERAL EMBODIMENTS OF THE INVENTION

Figure 1:
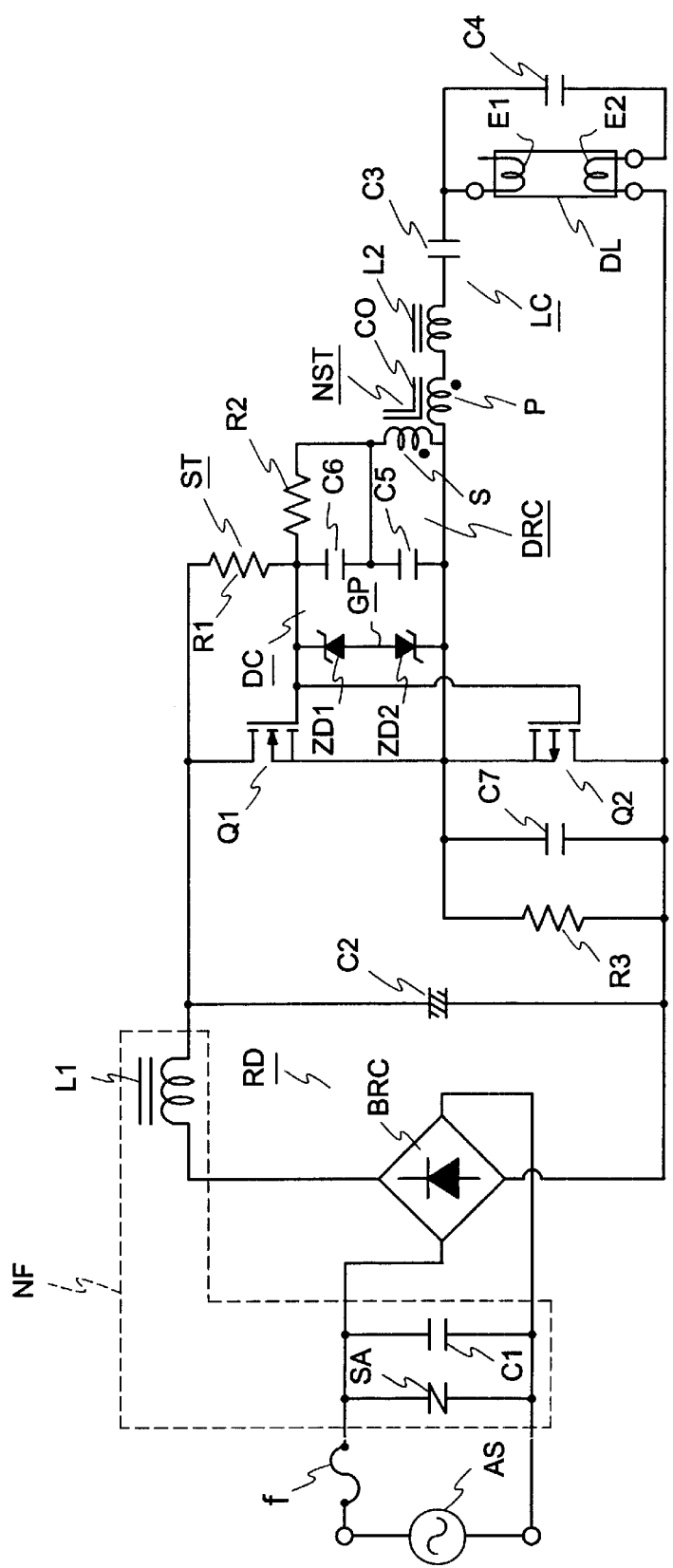
FIG. 1 is a circuit diagram of an electronic ballast including a power supply apparatus according to an embodiment of the present invention.

FIG. 1 shows a circuit diagram of an electronic ballast including a power supply apparatus according to an embodiment of the present invention. The electronic ballast for a discharge lamp employs an alternating current power supply (AS) of 100V. A fuse (f) is formed on a circuit board. A noise filter (NF) has a first portion arranged directly between the power supply (AS) and a rectified direct current power source (RD), and second portion arranged between the rectified direct current power (RD) and a first switching element (Q1).

Noise filter (NF) reduces noise generated by the switching of a pair of switching elements (Q1, Q2). The first portion of the noise filter (NF) has a capacitor (C1) and a surge absorber (SA). The second portion of the noise filter (NF) has an inductor (L1).

The rectified direct current power source (RD) includes a full-wave rectification circuit (BRC) connected to a smoothing capacitor (C2). A first switching element (Q1), e.g., an N-channel enhancement mode MOSFET, has a terminal, e.g., a drain, connected to a positive side of the rectified direct current power source (RD). A second switching element (Q2), e.g., a P-channel enhancement mode MOSFET, has a terminal, e.g., a drain, connected to a negative side of the rectified direct current power source (RD). Other electronic elements, e.g., an inductor, or a resistor, may be arranged between the rectified direct current power source (RD) and the switching elements (Q1, Q2).

Accordingly, the first and second switching elements (Q1, Q2) are complementary connected to each other, and can generate a high-frequency alternating current for a load circuit (LC). That is, when a drive voltage from a drive circuit is provided between the gate and source of each MOSFET at the same time, the N-channel MOSFET turns on when the supplied voltage is positive, and the P-channel MOSFET turns on when the supplied voltage is negative. If the drive signal is not supplied, both MOSFETs remain OFF. Such being the case, the MOSFETs are turned on alternately. As a result, the drive circuit becomes simple, so that the ballast using the drive circuit can be compact.

The direct current power source may be a battery. The pair of switching elements may be complementary or of the same type.

The electronic ballast for a discharge lamp further comprises a load circuit (LC), an unsaturated transformer (NST), a drive resonance circuit (DRC), a drive circuit (DC), and a starting circuit (ST).

The load circuit (LC) is provided with a series resonance circuit including a resonance inductor (L2), a capacitor (C3) for cutting off direct current, and a resonance capacitor (C4).

The load circuit (LC) also includes a discharge lamp (DL) as a load connected in parallel across resonance capacitor (C4). The capacitor (C3) and the resonance capacitor (C4) serve as a resonance capacitance. In this case, as the capacitance of the capacitor (C3) is larger than that of capacitor (C4), the resonance capacitor (C4) primarily operates as the resonance capacitance. One end of the resonance inductor (L2) is connected to one end of a primary coil (p) of the unsaturated transformer (NST), and the other end is connected to one end of the capacitor (C3). The resonance inductor (L2) can also act as a current-limiting impedance. The other end of the capacitor (C3) is connected to one end of the discharge lamp (DL). In this embodiment, the discharge lamp (DL) is a fluorescent lamp. The fluorescent lamp has a pair of filaments (E1, E2). A power supply side terminal of the filament (E1) is connected to the other end of the capacitor (C3). Furthermore, a power supply side terminal of the filament (E2) is connected to the drain of the second switching element (Q2). One end of the resonance capacitor (C4) is connected to the power supply side terminal of the filament (E1), and the other end thereof is connected to the other terminal of the filament (E2). The other terminal of the filament (E1) is not connected to anything.

Figure 5:
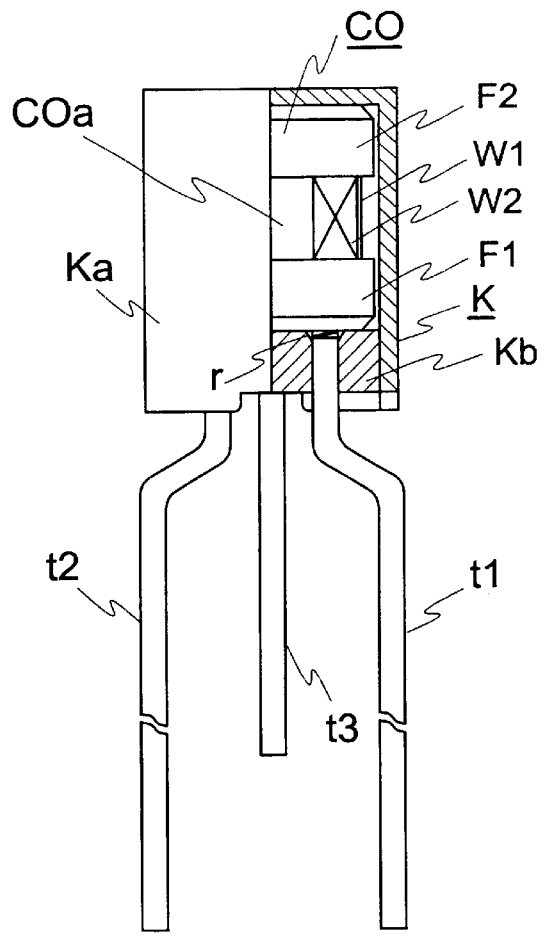
FIG. 5 is an enlarged front view, partly in section, of the unsaturated transformer shown in FIG. 4.

An unsaturated transformer (NST) is provided with a core (CO), a secondary coil (s), and a primary coil (p). The core as shown in FIG. 5 is made of ferrite, is formed in a drum shape, and has a magnetic path that leaves the core. Accordingly, the transformer (NST) does not saturate.

The secondary coil (s) made of insulated wire corresponds to the second winding (w2) shown in FIG. 5, and is wound on the core (CO) 270 times. One end of the secondary coil (s) is connected to the source of the first and second switching elements (Q1, Q2). The inductance (Ln2) of the secondary coil (s) is 1857 $\mu$H. Furthermore, when the primary coil 15; (p) is shorted, a equivalent inductance (Ln2eq), which equivalently exists in the secondary coil (s), is 1855 $\mu$H.

The primary coil (p) made of an insulated wire corresponds to the first winding (w1) shown in FIG. 5, and is wound on the secondary coil (s) 10 times. One end of the primary coil (p) is connected to the source of the first and second switching elements (Q1, Q2). The other end of the primary coil (p) is connected to one end of the resonance inductor (L2). The primary coil (p) is arranged in series with the load circuit (LC). The inductance (Ln1) of the primary coil (p) is 2.1 $\mu$H. Furthermore, when the secondary coil (s) is shorted, an equivalent inductance (Ln1eq), which equivalently exists in the primary coil (p), is 1.2 $\mu$H. The ratio Ln2/Ln1 is 884, and the ratio Ln2eq/Ln2 is about 1. The above-mentioned inductances (Ln1, Ln2, Ln1 eq, and Ln2eq) are measured at a frequency of 1 KHz and a voltage of 1V.

The ratio Ln2/Ln1 can be 100 or more. In this case, as the primary coil does not operate as the resonance inductance, the secondary coil (s) can generate an induced voltage in proportion to the current of the load circuit. However, when the ratio Ln2/Ln1 is under 100, the inductance (Ln1) of the primary coil (p) relatively becomes larger. As a result, the inductance (Ln1) of the primary coil (p) gradually begins to operate as a resonance inductance, so that the secondary coil cannot generate an induced voltage in proportion to the current flowing in the load circuit. Also, the drive resonance circuit (DRC), which resonates to the induced voltage of the secondary coil (s), cannot generate a resonance output for the drive circuit (DC). Therefore, the ratio Ln2/Ln1 may be between 500 and 1000.

The ratio Ln2eq/Ln2 can be 0.5 or more. When the primary coil (p) is shorted, an equivalent inductance (Ln2eq), which equivalently exists in the secondary coil (s) in series, indicates an actual inductance. The drive resonance circuit (DRC) resonates by using this inductance together with the capacitance.

Moreover, the primary coil (p) does not receive the high resonance voltage from the load circuit, because the primary coil (p) has a small inductance, which does not substantially operate as the resonance inductance. Therefore, the primary coil (p) need not have a high dielectric strength as conventional additional windings. It is suitable for a ratio of the inductance of the primary coil (p) to be 2% or less in comparison with the resonance inductance. The ratio may be 1% or less. Furthermore, it is better that the unsaturated transformer is arranged so as not to interfere with the resonance inductance of the load circuit. In this case, if other elements, e.g., a capacitor, are arranged between the unsaturated transformer and the resonance inductance, the elements can protect the transformer from the interference of the resonance inductance.

The drive resonance circuit (DRC) includes the capacitor (C5) connected in parallel with the secondary coil (s) of the unsaturated transformer (NST). The drive resonance circuit (DRC), which resonates with an induced voltage in the secondary coil (s) and the capacitance of the capacitor (C5), generates a resonance output which is supplied to the drive circuit (DC). The drive resonance circuit (DRC) is formed as a series resonance circuit with the inductance (Ln2) of the secondary coil (s) and the capacitance of the capacitor (C5). That is, when the secondary coil (s) generates an induced voltage, the equivalent inductance (Ln2eq) of the secondary coil (s) and the capacitor (C5) are connected in series. The capacitance may be that of a capacitor (C5), or a capacitance of the switching elements, e.g., a capacitance between the gate and source of a MOSFET.

The drive circuit (DC) comprises a capacitor (C6) having a large capacitance and a gate protection circuit (GP). The drive circuit (DC) supplies a drive signal to the switching elements (Q1, Q2). The capacitor (C6) is arranged between the gates of the switching elements (Q1, Q2) and a junction between capacitor (C5) and the secondary coil (s) of the drive resonance circuit (DRC). The gate protection circuit (GP) clamps the gate-to-source voltage to a limit determined by the voltage ratings of the back-to-back Zener diodes (ZD1, ZD2).

A starting circuit (ST) including three resistors (R1, R2, and R3) is connected in series across the rectified direct current power source (RD). One end of the resistor (R1) is connected to the positive side of the rectified direct current power source (RD), and the other end thereof is connected to a junction between the gate of the first switching element (Q1) and capacitor (C6) of the drive circuit (DC). The resistor (R2) is connected in parallel with the capacitor (C6). The resistor (R3) is connected in parallel with the drain and source of the second switching element (Q2). The resistor (R3) is also connected in parallel with a capacitor (C7). The starting circuit (ST) causes a drive signal for starting the ballast to be generated by dividing a direct current power voltage. Furthermore, the drive signal is supplied to a drive terminal of the first switching element (Q1), which conducts a current from the direct current power source.

The discharge lamp of the load circuit (LD) may be a low- or high-pressure discharge lamp. An example of a suitable low-pressure discharge lamp is a fluorescent lamp having a pair of filaments, which emit thermions when the filament is heated. Heating is accomplished as follows. The resonance capacitance (C4) is connected in parallel to the fluorescent lamp. As current flows into the filament (E2) via the resonance capacitance (C4) and resonance inductance (L2) when the lamp is starting, the filament (E2) is heated. At the same time, the resonance inductance (L2) resonates with the resonance capacitance (C4) moderately, so that the lamp (DL) lights up quickly.

An operation of the above-mentioned circuit will be explained hereinafter. A direct current voltage from the rectified direct current power source (RD) is supplied to the smoothing capacitor (C2) when the alternating current power supply (AS) turns on. The direct current voltage is smoothed by the smoothing capacitor (C2). The smoothed direct current voltage is supplied between the drain and source of the first and second switching elements (Q1, Q2) respectively. At this time, the first and second switching elements (Q1, Q2) are OFF because no voltage is supplied to the gates thereof. Furthermore, the rectified direct current power source (RD) also supplies the direct current voltage to the series circuit including the resistors (R1, R2, and R3), so that a voltage drop occurs across each resistor. As a result, the capacitor (C6) is charged by the voltage drop across the resistor (R2). Moreover, the voltage drop is supplied between the gates and sources of the switching elements (Q1, Q2) respectively. When the voltage drop across the resistor (R2) is supplied to the gate of the first switching element (Q1), it turns on. However, the second switching element (Q2) is still OFF, because a negative voltage is supplied to the gate thereof.

When the first switching element (Q1) turns on, the direct current of the rectified direct current power source (RD) flows through a path including the positive side of the rectified direct current power source (RD), the drain and source of the first switching element (Q1), the primary coil (p) of the unsaturated transformer (NST), the load circuit (LC), the resonance capacitor (C4), and the negative side of the rectified direct current power source (RD). At the same time, the series resonance circuit having the resonance inductance (L2), the capacitor (C3), and the resonance capacitor (C4) resonates, so that a voltage of the resonance capacitor (C4) can increase and also be charged.

Furthermore, the current flowing into the primary coil (p) induces a voltage in the secondary coil (s) in proportion to the current of the load circuit (LC). The induced voltage in the second coil (s) resonates in the drive resonant circuit (DRC) including the inductance (Ln2) of the second coil (s) and the capacitance of the capacitor (C5). This resonance voltage can continuously supply a voltage between the gate and source of the switching element (Q1). Therefore, the switching element (Q1) is maintained in an ON state. However, the second switching element (Q2) is still OFF, because the negative of the above-mentioned resonance voltage is supplied between the gate and source of the second switching element (Q2). However, the resonance voltage of the drive resonance circuit (DRC) is inverted to the opposite polarity during the next half cycle of the resonance voltage. At this time, the gate-to-source voltage of the first switching element (Q1) becomes a negative, so that the switching element (Q1) turns OFF. However, the second switching element (Q2) turns ON, because the gate-to-source voltage of the second switching element (Q2) reverses to a positive voltage. Accordingly, the capacitance of the capacitor (C5) of the drive resonance circuit (DRC) and the inductance (Ln2) of the secondary coil(s) of the unsaturated transformer (NST) can control an ON term of the first switching element (Q1).

Furthermore, when the first switching element (Q1) turns OFF, the electromagnetic energy stored in the resonance inductance (L2) is released as a current. The current flows through a path including the resonance inductance (L2), the capacitor (C3), the resonance capacitor (C4), the second switching element (Q2) including a diode (not shown), the primary coil (p) of the unsaturated transformer (NST), and the resonance inductance (L2). When this current stops, an electrical charge of the resonance capacitor (C4) discharges through an opposite path, including the capacitor (C3), the resonance inductance (L2), the primary coil (p) of the unsaturated transformer (NST), the second switching element (Q2), and the resonance capacitor (C4). In this case, the induced voltage of the secondary coil (s) resonates in the drive resonance circuit (DRC), so that the resonance voltage turns the first switching element (Q1) OFF, and turns the second switching element (Q2) ON. However, the resonance voltage of the drive resonance circuit (DRC) is inverted to the other polarity during the next half-cycle of the resonance. Moreover, if the resonance voltage of the drive resonance circuit (DRC) exceeds a limited voltage, the excessive voltage is absorbed by the gate protection circuit (GP).

The current flowing into the resonance capacitor (C4) also flows into the filament (E2) of the electrode, so that the current heats the filament easily. Therefore, the filament can easily emit thermal electrons. As the higher resonance voltage is also supplied between the electrodes (E1,E2), the discharge lamp of load circuit (LD) can light up more easily. Accordingly, after the electromagnetic energy stored in the resonance inductance (L2) is released, once more, the rectified direct current power source (RD) supplies current to load circuit (LD). The above-mentioned operation of the half-bridge inverter continues to repeat.

Figure 2:
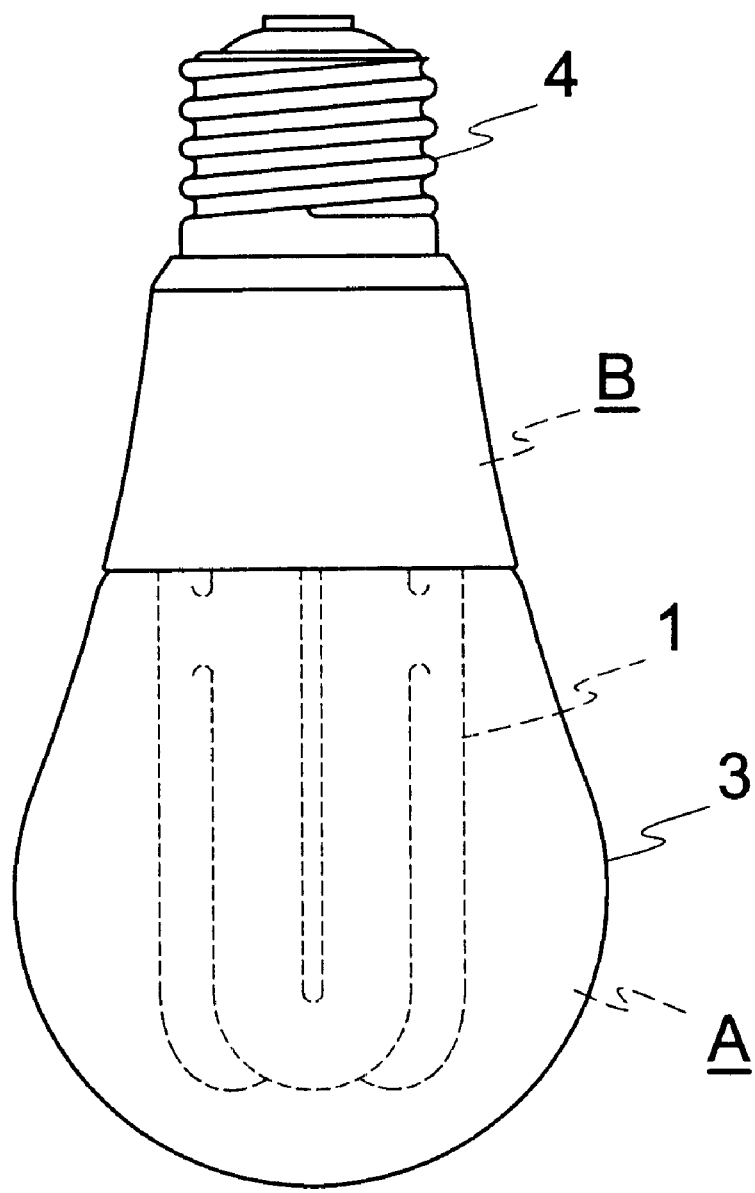
FIG. 2 is a front view of a compact self-ballasted fluorescent lamp according to an embodiment of the present invention.
Figure 3:
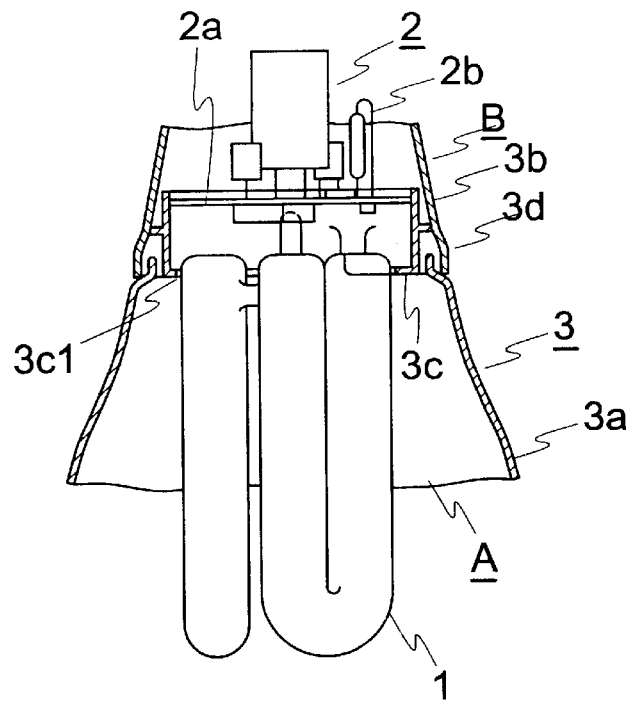
FIG. 3 is an enlarged partly longitudinal section of the compact self-ballasted fluorescent lamp shown in FIG. 2.

FIG. 2 shows a front view of an compact self-ballasted fluorescent lamp according to an embodiment of the present invention. FIG. 3 shows an enlarged partly longitudinal section of the lamp shown in FIG. 2. The compact self-ballasted fluorescent lamp is provided with a fluorescent lamp (1), an electronic ballast (2), an enclosure (3), and a lamp cap (4). The fluorescent lamp comprises a light-transmitting envelope which is formed by coupling three U-shaped glass bulbs, a phosphor layer formed on the inner surface of the envelope, a pair of electrodes, and an ionizable gas, which fills the envelope, having mercury and a rare gas. The electronic ballast shown in FIG. 1 is used in the compact self-ballasted fluorescent lamp.

The enclosure comprises a light-transmitting outer bulb (3a) made of glass having a diffuser on the inner surface thereof, a base (3b) made of plastic and fixed to an open end of the outer bulb (3a) via a silicone adhesive agent (3d), and a separator (3c) arranged between the outer bulb (3a) and the holder (3b). The separator, which defines some holes to hold the envelope via a silicone adhesive agent, is also fixed to the open end of the outer bulb (3a) by means of silicone adhesive agent (3d). Accordingly, the inside of the outer bulb (3a) is separated into a lamp housing (A) accomodating the envelope and a ballast housing (B) accommodating a ballast circuit connected to the lamp. The lamp cap (4), which is coupled to one end of the base (3b), is connected to an alternating current power supply. The compact self-ballasted fluorescent lamp may not include the outer bulb. Moreover, the lamp may further comprise a reflector. Further, the ballast may be detached from the lamp.

Figure 4:
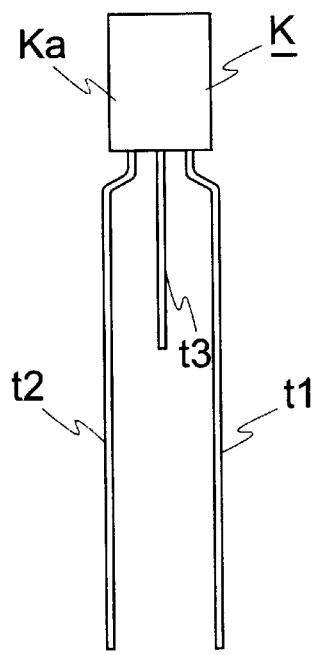
FIG. 4 is a front view of a first embodiment of an unsaturated transformer.
Figure 6:
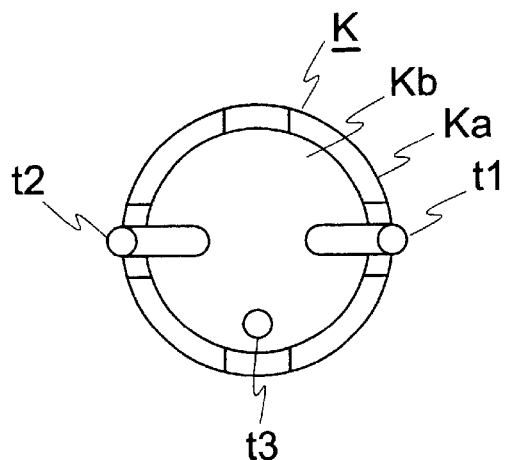
FIG. 6 is a bottom view of the unsaturated transformer shown in FIG. 5.
Figure 7:
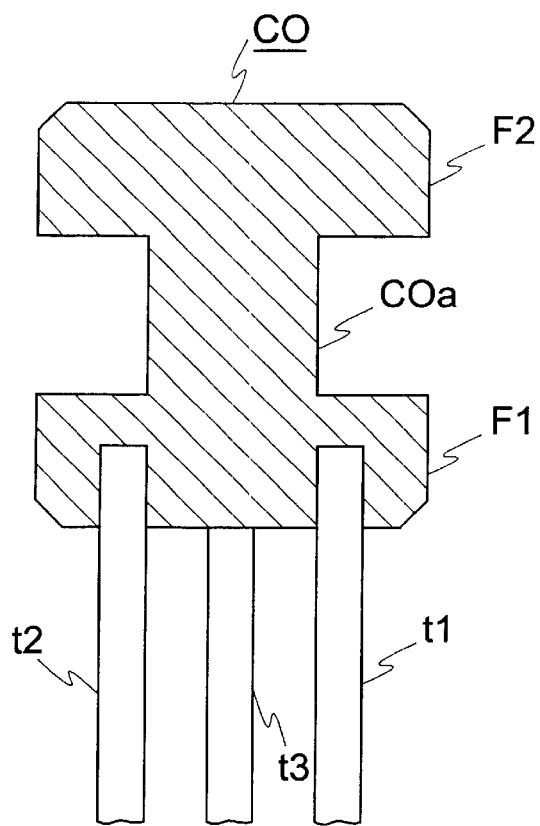
FIG. 7 is an enlarged longitudinal section of a core of the unsaturated transformer shown in FIG. 5.
Figure 8:
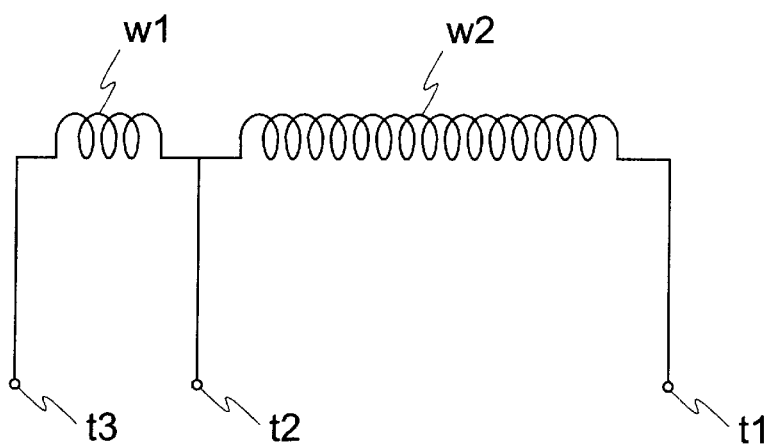
FIG. 8 is a circuit diagram of the unsaturated transformer shown in FIG. 4.

Referring to FIGS. 4 to 8, a first embodiment of the transformer will be explained. FIG. 4 shows a front view of an unsaturated transformer. FIG. 5 shows an enlarged front view, partly in section, of the unsaturated transformer shown in FIG. 4. FIG. 6 shows a bottom view of the unsaturated transformer shown in FIG. 5. FIG. 7 shows an enlarged longitudinal section of a core of the unsaturated transformer shown in FIG. 5. FIG. 8 is a circuit diagram of the unsaturated transformer shown in FIG. 4. The transformer shown in FIGS. 4 to 8 is provided with a core (CO), flanges (F1, F2), a first connecting terminal (t1), a second connecting terminal (t2), a third connecting terminal (t3), a first winding (w1), a second winding (w2), and casing (K).

The core, made of Ni—Zn ferrite, which comprises a body (COa), and the flanges (F1, F2), respectively arranged on opposite ends of the body, form a drum shape. As shown in FIG. 5, the flange (F1), made of an insulator, has embedded in it one of the ends of each of the first connecting terminal (t1), the second connecting terminal (t2), and the third connecting terminal (t3). The flange (F2), also made of insulator, is arranged on the opposite side of the body (COa). The flanges (F1, F2) guide windings (w1, w2). It is easy for the winding (w2), corresponding to the above-mentioned secondary coil (s), to wind on the core in comparison with a conventional ring core making a closed magnetic path. Furthermore, since the core does not saturate in operation, a secondary voltage can be generated in proportion to a current flowing through the second winding (w2).

A magnetic path of core (COa) can be formed in the core and the surrounding area. Specifically, the magnetic path is not formed only in the core. Therefore, the core does not saturate substantially. The core can be made of ferrite, which has good high-frequency characteristics.

As shown in FIG. 6, the first and second connecting terminals (t1, t2) are made of conductive pins and are arranged on opposite sides of the flange (F1). Further, the third connecting terminal (t3) is disposed halfway between the two terminals (t1, t2). Specifically, the three terminals (t1, t2, and t3) form a triangle on the flange (F1). Moreover, the three terminals (t1, t2, and t3) are inserted into holes on a circuit board and soldered to the board. Accordingly, the connecting terminals (t1, t2, and t3) can be connected to other electric elements, and be held by the board. Moreover, when the second connecting terminal (t2) is connected to both one end of the second winding (w2) and one end of the first winding (w1), the first and second windings (w1, w2) are connected in series so that the polarity of the windings (w1, w2) cannot be mistaken. Furthermore, the first and second connecting terminals (t1, t2) are bent as shown in FIG. 4 to diverge as the terminals extend away from casing (K). However, the third connecting terminal (t3) is made of a conductive pin that extends straight.

The conductive pins may be formed long. Each conductive connecting terminal may be formed in a flat shape in order to be mounted on a circuit board. Furthermore, each conductive connecting terminal may be formed without the conductive pin. For example, the terminals may comprise the ends of the first and second winding (w1, w2) wound to a projecting portion made from the flange.

The second winding (w2) made of an insulated wire is easily wound on to the body (COa) of the core because the core is not a conventional ring core. Furthermore, both ends of the second winding (w2) extend to the first and second connecting terminals (t1, t2), respectively, and are soldered. The second winding (w2) has a relatively large number of turns, so that an inductance (Lf) thereof is relatively large. An inductance (Ls) of the first winding (w1) corresponding to the above-mentioned primary coil (p) is relatively small.

The first winding (w1) made of an insulated wire is still wound on to the second winding (w2) easily. The ends of the first winding (w1) are respectively fixed to the second and third connecting terminals (t2, t3). The first winding (w1) does not have many turns relative to the second winding (w2). One end of the first winding (w1) shares the second connecting terminal (t2) with one end of the second winding (w2). Accordingly, the transformer can become smaller. The first and second windings (w1, w2) may be separated by an insulating paper.

The casing, made of plastic, includes a cap (Ka) accommodating the core, and the first and second windings (w1, w2), and a base (Kb) fixed on a lower surface of the flange (F1) using an adhesive agent. The side surface of the base (Kb) is glued to the cap (Ka). Furthermore, the base defines holes (h) through which the terminals (t1, t2, and t3) pass. Also, a hollow (r) is formed around the connection between each of the connecting terminal (t1, t2, and t3) and the windings (w1 and w2).

FIGS. 9 to 17, illustrate second to ninth embodiments of the transformer. Similar reference characters designate identical or corresponding elements of the first embodiment. Therefore, detail explanations of the structure will not be provided.

Figure 9:
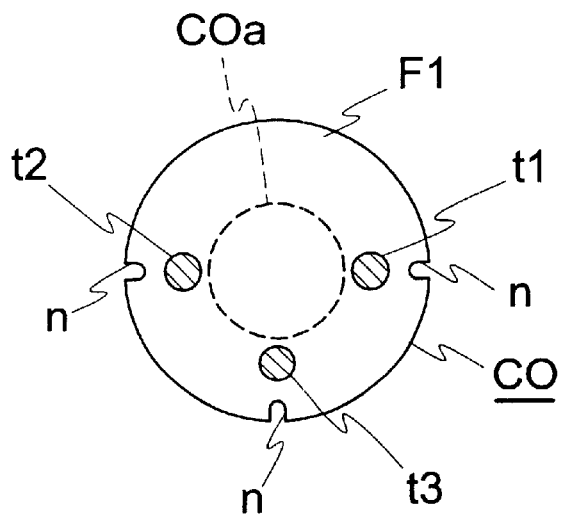
FIG. 9 is a bottom view of a flange of a second embodiment of an unsaturated transformer.

FIG. 9 shows a bottom view of a flange of an unsaturated transformer according to a second embodiment. The difference between the first and second embodiments is that in the second embodiment, slits (n) are formed on the side surface of the flange (F1) adjacent to the connecting terminals (t1, t2, and t3). The slits are useful to guide the ends of the connecting terminals (t1, t2, and t3).

Figure 10:
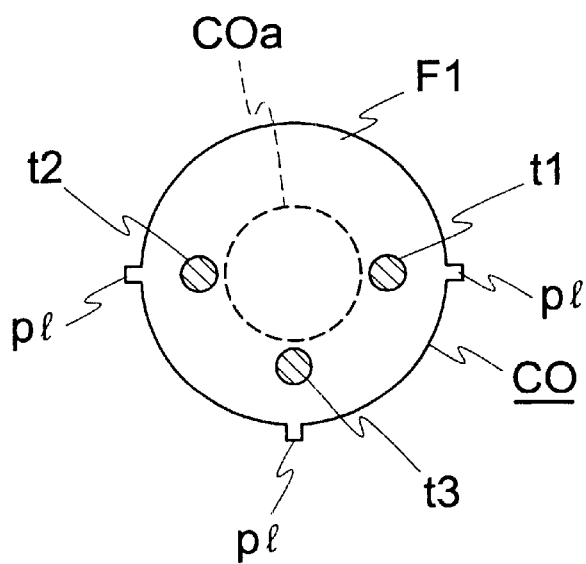
FIG. 10 is a bottom view of a flange of a third embodiment of an unsaturated transformer.

FIG. 10 shows a bottom view of a flange of an unsaturated transformer according to a third embodiment. In this embodiment, projections (p1) are formed on the side surface of the flange (F1) adjacent to the connecting terminals (t1, t2, and t3). The projections (p1) are also useful to guide the ends of the connecting terminals (t1, t2, and t3).

Figure 11:
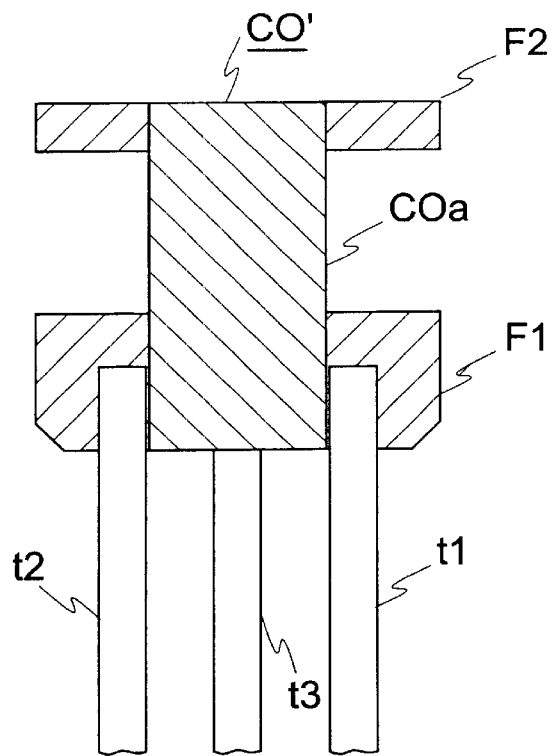
FIG. 11 is an enlarged longitudinal section of a core of a fourth embodiment of an unsaturated transformer.

FIG. 11 shows an enlarged longitudinal section of a core of an unsaturated transformer according to a fourth embodiment. According to this embodiment, a core (CO') is made of a rod, and a pair of flanges made of plastic are arranged on both ends of the rod.

Figure 12:
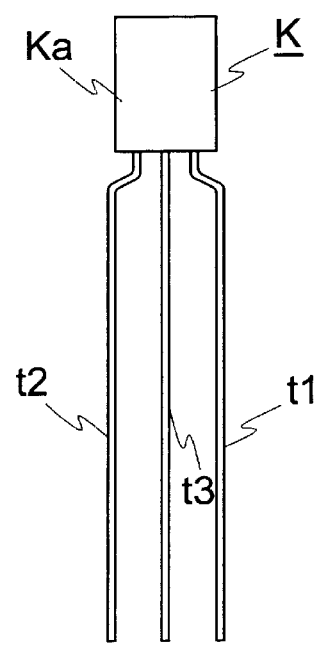
FIG. 12 is a front view of a fifth embodiment of an unsaturated transformer.
Figure 13:
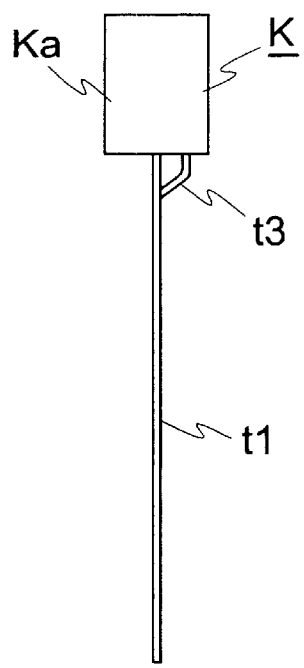
FIG. 13 is a side view of the unsaturated transformer shown in FIG. 12.

FIG. 12 shows a front view of an unsaturated transformer according to a fifth embodiment. FIG. 13 shows a side view of the unsaturated transformer shown in FIG. 12. This embodiment is different from the first embodiment in that in this embodiment, the length of each of the connecting terminals (t1, t2, and t3) is the same. Moreover, the three connecting terminals (t1, t2, and t3) are arranged in the same plane.

Figure 14:
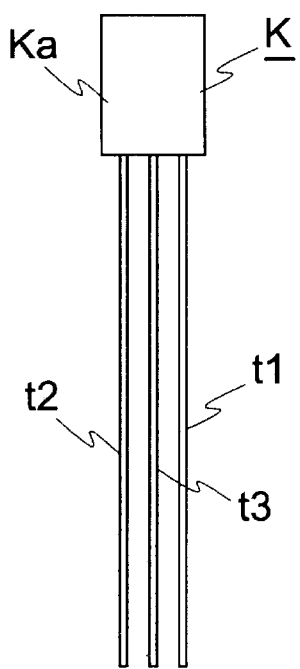
FIG. 14 is a front view of a sixth embodiment of an unsaturated transformer.

FIG. 14 shows a front view of an unsaturated transformer according to a sixth embodiment. In this embodiment, the first and second connecting terminals (t1, t2) are straight and have the same length.

Figure 15:
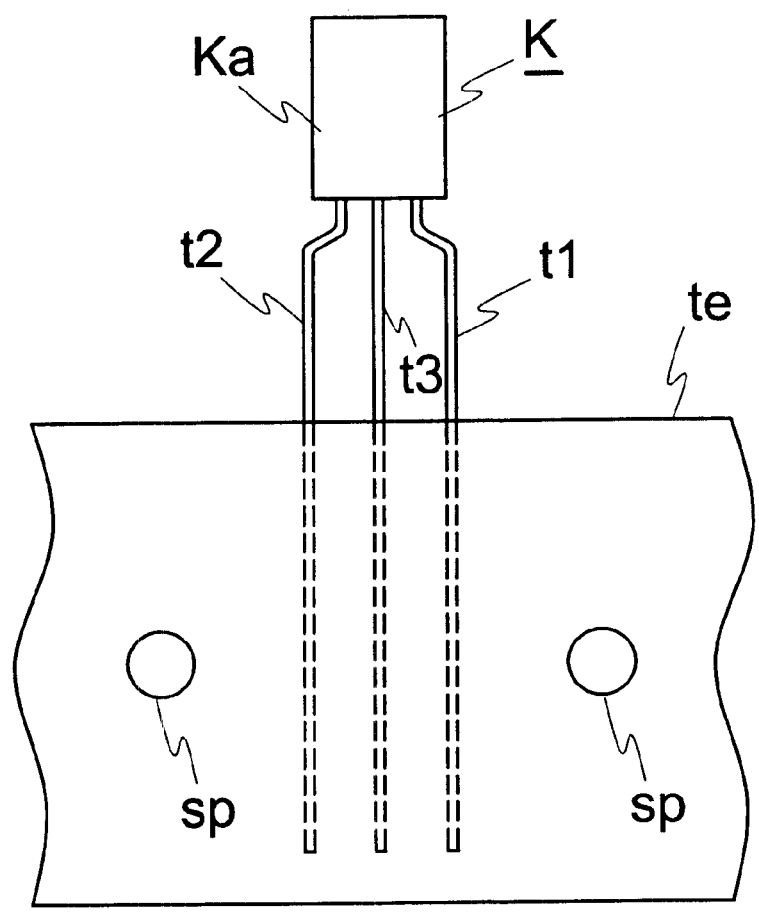
FIG. 15 is a front view of a seventh embodiment of an unsaturated transformer.

FIG. 15 shows a front view of an unsaturated transformer according to a seventh embodiment. Three connecting terminals (t1, t2, and t3) of an unsaturated transformer are held between a pair of tapes by sealing portions which connect the tapes to each other. The tapes with the transformers are loaded in an inserting machine to mount the connecting terminals on a circuit board, having some sealing portion (sp). In this case, the machine can appropriately properly insert the terminals of the transformer into holes of the circuit board (not shown).

Figure 16:
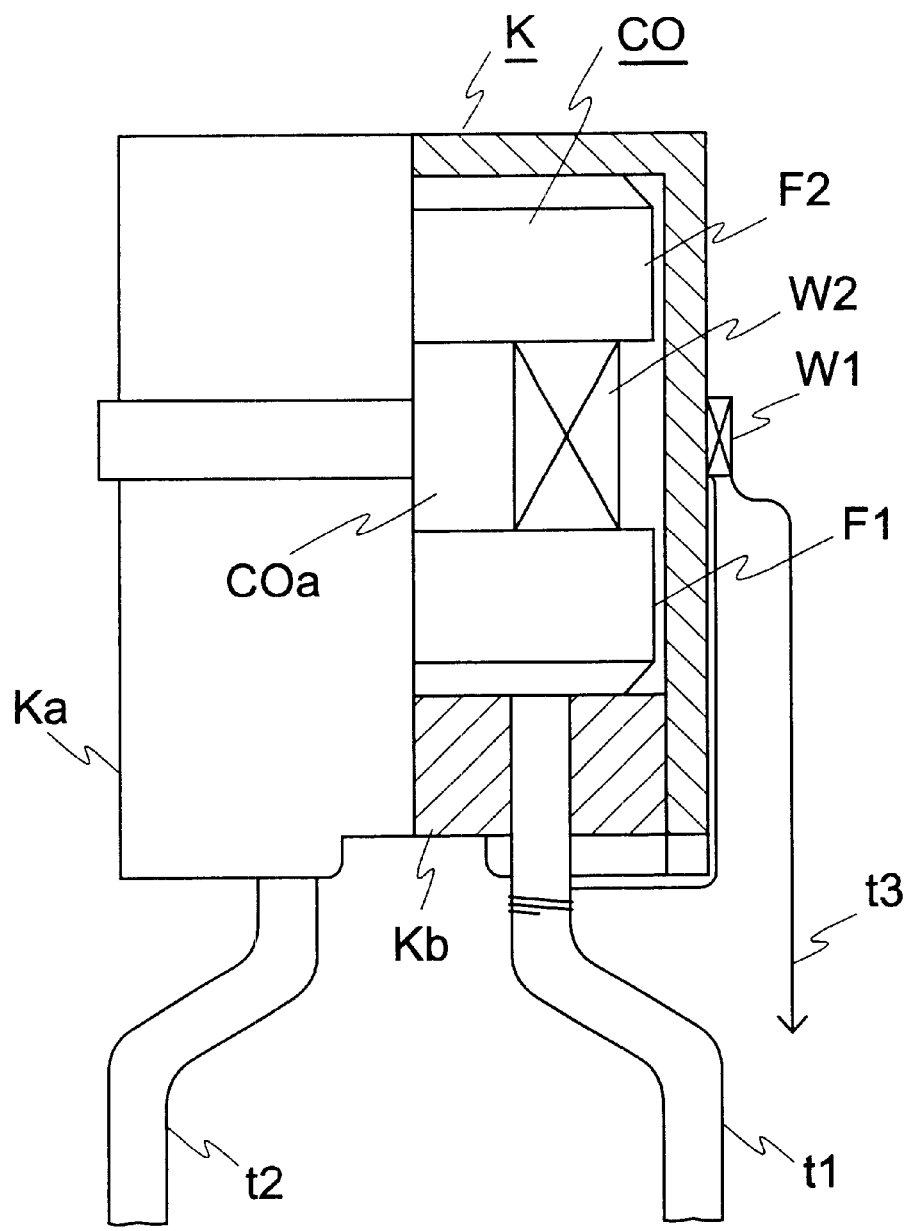
FIG. 16 is an enlarged front view, partly in section, of an eighth embodiment of an unsaturated transformer.

FIG. 16 shows an enlarged front view, partly in section, of an unsaturated transformer according to an eighth embodiment. In this embodiment, a conventional transformer can be used. A first winding (w1) is further wound on the outer surface of casing (K) around the second winding (w2) of the conventional transformer and is glued. One end of the winding (w1) connects to the second connecting terminal (t2), and the other end is the third connecting terminal (t3).

Figure 17:
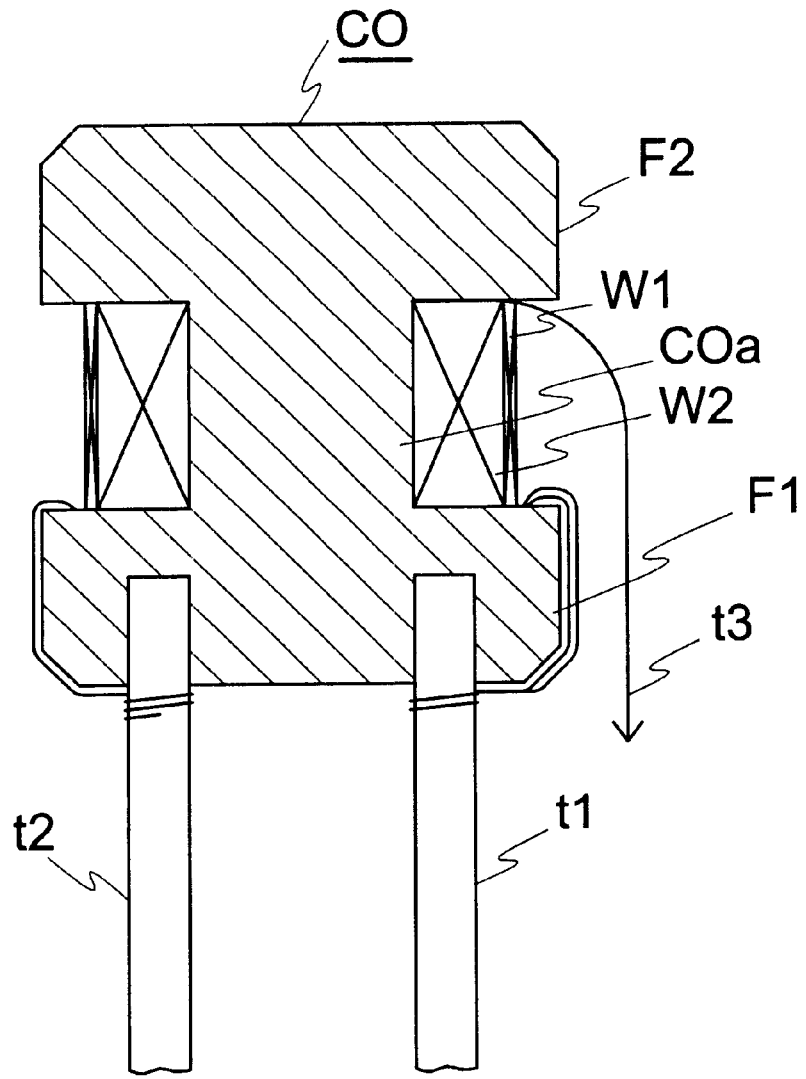
FIG. 17 is an enlarged front view, partly in section, of a ninth embodiment of an unsaturated transformer.

FIG. 17 shows an enlarged front view, partly in section, of an unsaturated transformer according to a ninth embodiment. A conventional inductance coil is used as a first winding (w1) in this embodiment. Furthermore, a first winding (w1) is wound on the conventional inductance coil. The first winding (w1) is fixed by a tape (not shown). Connecting terminals of the first and second windings (w1,w2) are arranged as in the eighth embodiment.

What is claimed is:

1. A power supply apparatus comprising:
    a direct current power source having a pair of terminals;
    first and second switching elements complementary connected in series between said pair of terminals of said direct current power source, said first and second switching elements each having a gate and a source, the gate and the source of said first switching element connected to the gate and the source of said second switching element, respectively;
    a load circuit, which includes a resonance inductance and a resonance capacitance, receiving a high-frequency alternating current generated by the switching of said first and second switching elements;
    an unsaturated transformer having a first winding which has an inductance less than said resonance inductance, connected in series to said load circuit, and a second winding generating an induced voltage in proportion to a current flowing in said load circuit, one end of said first and second windings of said unsaturated transformer being connected with said source of said first and second switching elements; and
    a drive resonance circuit including a capacitance, and an inductance of said second winding, and producing a resonance output which is applied to said gate of said first and second switching elements to cause said first and second switching elements to alternately conduct.

2. A power supply apparatus according to claim 1, wherein a ratio Ln2/Ln1 of said unsaturated transformer is 100 or more, wherein said Ln2 is an inductance of said second winding of said unsaturated transformer, and said Ln1 is an inductance of said first winding.

3. A power supply apparatus according to claim 2, wherein a ratio Ln2eq/Ln2 of said unsaturated transformer is 0.5 or more, and said Ln2eq is an equivalent inductance existing in said second winding equivalently, when said first winding is shorted.

4. A power supply apparatus as in claim 1 or 2, in which said first and second switching elements are complementary MOSFET switching elements.

5. A power supply apparatus as in claim 1 or 2, in which said capacitance of said drive resonance circuit comprises a gate-to-source capacitance.

6. A power supply apparatus as in claim 1 or 2, in which said switching elements are field effect transistors and a capacitance of said drive resonance circuit comprises a gate-to-source capacitance of said switching elements.

7. An electronic ballast using a power supply comprising:
    a power supply apparatus comprising:
        a direct current power source having a pair of terminals,
        first and second switching elements complementary connected in series between said pair of terminals of said direct current power source, said first and second switching elements each having a gate and a source, the gate and the source of said first switching element connected to the gate and the source of said second switching element, respectively, a load circuit, which includes a resonance inductance and a resonance capacitance, receiving a high-frequency alternating current generated by a switching of said first and second switching elements, an unsaturated transformer having a first winding which has an inductance less than said resonance inductance, connected in series to said load circuit, and a second winding generating an induced voltage in proportion to a current flowing in said load circuit, one end of said first and second windings of said unsaturated transformer being connected with said source of said first and second switching elements, and a drive resonance circuit including a capacitance, and an inductance of said second winding, and producing a resonance output which is applied to said gate of said first and second switching elements to cause said first and second switching elements to alternately conduct; and a discharge lamp connected to said load circuit.

8. A self-ballasted discharge lamp comprising:

an electronic ballast using a power supply comprising:
  a power supply apparatus comprising:
    a direct current power source having a pair of terminals,
    first and second switching elements complementary connected in series between said pair of terminals of said direct current power source, said first and second switching elements each having a gate and a source, the gate and the source of said first switching element connected to the gate and the source of said second switching element, respectively, a load circuit, which includes a resonance inductance and a resonance capacitance, receiving a high-frequency alternating current generated by a switching of said first and second switching elements, an unsaturated transformer having a first winding which has an inductance less than said resonance inductance, connected in series to said load circuit, and a second winding generating an induced voltage in proportion to a current flowing in said load circuit, one end of said first and second windings of said unsaturated transformer being connected with said source of said first and second switching elements, and a drive resonance circuit including a capacitance, and an inductance of said second winding, and producing a resonance output which is applied to said gate of said first and second switching elements to cause said first and second switching elements to alternately conduct;

a discharge lamp connected to said load circuit; and an enclosure accommodating said discharge lamp and said electronic ballast.

\* \* \* \* \*